(12) United States Patent
Deepak et al.

(10) Patent No.: US 10,049,096 B2
(45) Date of Patent: Aug. 14, 2018

(54) SYSTEM AND METHOD OF TEMPLATE CREATION FOR A DATA EXTRACTION TOOL

(71) Applicant: Infosys Limited, Bangalore (IN)

(72) Inventors: Krishnamurty Sai Deepak, Bangalore (IN); Ganesh Kumar Nunnagoppula, Bangalore (IN); Ann Matthew, Bangalore (IN); Harikrishna G. N Rai, Bangalore (IN); P. Radha Krishna, Hyderabad (IN); Rajesh Balakrishnan, Bangalore (IN); Shreyas Bettadapura Guruprasad, Bangalore (IN); Bintu G. Vasudevan, Bangalore (IN)

(73) Assignee: Infosys Limited, Bangalore (IN)

( * ) Notice: Subject to any disclaimer, the term of this patent is extended or adjusted under 35 U.S.C. 154(b) by 12 days.

(21) Appl. No.: 15/165,630

(22) Filed: May 26, 2016

(65) Prior Publication Data

US 2016/0371246 A1     Dec. 22, 2016

(30) Foreign Application Priority Data

Jun. 19, 2015   (IN) .......................... 3084/CHE/2015

(51) Int. Cl.
*G06K 9/00*      (2006.01)
*G06F 17/24*    (2006.01)
(Continued)

(52) U.S. Cl.
CPC .......... *G06F 17/248* (2013.01); *G06F 17/241* (2013.01); *G06F 17/243* (2013.01);
(Continued)

(58) Field of Classification Search
CPC .. G06F 17/241; G06F 17/212; G06F 17/2785; G06F 17/248; G06F 17/243; G06T 11/60; G06K 9/2054; G06K 9/6253
(Continued)

(56) References Cited

U.S. PATENT DOCUMENTS

| | | |
|---|---|---|
| 5,140,650 A | 8/1992 | Casey et al. |
| 5,305,396 A | 4/1994 | Betts et al. |

(Continued)

OTHER PUBLICATIONS

SmartSoft Invoices Automated Invoice Processing, http://www.smart-soft.net/products/invoice-ocr/smartsoft-invoices.htm, accessed on May 17, 2016.
(Continued)

*Primary Examiner* — Scott T Baderman
*Assistant Examiner* — Hassan Mrabi
(74) *Attorney, Agent, or Firm* — Klarquist Sparkman, LLP

(57) ABSTRACT

Methods and systems for template creation for a data extraction tool. A first template is selected from a plurality of documents provided by a user. An OCR engine annotates the first template and at least one data region in the first template corresponding to a set of parameters required in a target template is identified by selecting a geometrical region on the first template. At least one interim template is created based on the identification, and the plurality of documents are analyzed using the interim template to extract data values in the data region. The documents are converted to a format compliant with the target template based on the analysis.

19 Claims, 11 Drawing Sheets

(51) Int. Cl.
    *G06T 11/60*     (2006.01)
    *G06K 9/20*     (2006.01)
    *G06K 9/62*     (2006.01)

(52) U.S. Cl.
    CPC ......... *G06K 9/2054* (2013.01); *G06K 9/6253* (2013.01); *G06T 11/60* (2013.01)

(58) Field of Classification Search
    USPC ........................................................ 715/230
    See application file for complete search history.

(56) References Cited

U.S. PATENT DOCUMENTS

| | | |
|---|---|---|
| 5,317,646 A | 5/1994 | Sang, Jr. et al. |
| 5,555,362 A | 9/1996 | Yamashita et al. |
| 6,400,845 B1 | 6/2002 | Volino |
| 7,328,219 B2 | 2/2008 | Urquhart et al. |
| 7,668,372 B2 | 2/2010 | Schiehlen |
| 8,660,294 B2 | 2/2014 | Comay |
| 2004/0213458 A1* | 10/2004 | Kanatsu ............ G06F 17/30011 382/181 |
| 2011/0026828 A1* | 2/2011 | Balasubramanian . G06F 17/243 382/187 |
| 2013/0031145 A1* | 1/2013 | Luo .................. G06F 17/30876 707/812 |
| 2016/0048780 A1* | 2/2016 | Sethumadhavan ... G06F 19/322 705/2 |

OTHER PUBLICATIONS

Paul Flynn et al., "Automated Template-Based Metadata Extraction Architecture", Department of Computer Science, Old Dominion University, Springer-Verlag Berlin Heidelberg 2007.

Dharitri Misra et al., "A System for Automated Extraction of Metadata from Scanned Documents using Layout Recognition and String Pattern Search Models", National Library of Medicine, Bethesda, Maryland, 2009.

* cited by examiner (PRIOR-ART)

Document Instance 1 (after OCR)

Vendor Name
Address Line 1
PO Box 12345

Reference Number  99734

Tabular data

Type of Document

Other header data*   Alternate Reference Number : 22984

Consolidated document data and related details*

Please use Reference Number for all communication.

Document Instance 2 (after OCR)

Vendor Name
Address Line 1
PO Box 12345

Ref. Number  99734

Tabular data

Type of Document

Other header data*   Alternate Ref. Nummer : 22984

Consolidated document data and related details*

Please use Ref. Number for all communication.

Document Instance 1

Vendor Name
Address Line 1
PO Box 12345

820 → Reference Number | 99734 ← 810

Tabular data

Other header data*

Type of Document

Alternate Reference Number : 22984

Consolidated document data and related details*

Please use Reference Number for all communication.

Figure 8

SYSTEM AND METHOD OF TEMPLATE CREATION FOR A DATA EXTRACTION TOOL

This application claims priority to India Patent Application No. 3084/CHE/2015, filed Jun. 19, 2015, the disclosure of which is hereby incorporated by reference in its entirety.

BACKGROUND OF THE EMBODIMENT

Data entry from physical forms like order forms and invoices is an essential exercise for digitization of data in business process outsourcing. Digitization of essential data from such semi-structured forms are usually performed manually. Some software tools enable automation of data entry exercise. To avoid this, automation of data entry process in the Business Process Outsourcing (BPO) industry heavily relies on using OCR technology for converting images to text. After text data is generated, text enrichment and enhancement techniques are applied to refine OCR output so that required key fields are correctly detected and recognized. This type of automation platform helps in cost saving by eliminating large human force used in data entry process. Automatically extracted data are manually verified and corrected if necessary. Conventionally, automated extraction is achieved through the use of well-defined templates. Templates are created by technically trained users either using a GUI based tool or programmatically. Each template contains a set of general constructs/rules for recognition of textual data using optical character recognition engine and mapping recognized data to essential fields for extraction.

Creating a useful template can take anywhere between 1-2 hours which can be a significant roadblock where large volume of forms requiring thousands of templates are processed on daily basis. Accordingly, template creation can be very resource intensive.

To avoid this, automation of data entry process in the BPO industry heavily relies on using OCR technology for converting images to text. After text data is generated, text enrichment and enhancement techniques are applied to refine the OCR output so that required key fields are correctly detected and recognized. This type of automation platform helps in cost saving by eliminating large human force used in data entry process.

Success of such systems and methods mainly depends on the accuracy of the OCR process used in the platform. Existing OCR tools provide options to create templates through user a interface to configure them for best capture and recognition of fields in document images. In a majority of document images such as invoice images, there is some structure in-place to specify several keys and values. Template creation tools take advantage of these structure details in terms of their spatial alignment/co-ordinates with respect to invoice image co-ordinates. They manually annotate the key field location and value field location in a reference image and created template is applied on subsequent invoice images to correctly capture those fields. This template creation process is time consuming and requires experience to correctly configure the templates by making use of its capabilities to a full extent. There have been different approaches and techniques proposed to automate the template creation process.

SUMMARY OF THE EMBODIMENT

In an embodiment of the present invention a method and system of template creation for a data extraction tool is provided. The method includes selecting a first template from a plurality of documents provided by a user and performing a user verifiable OCR to annotate the first template. Subsequently the method includes identifying at least one data region in the first template corresponding to a set of parameters required in a target template, wherein the data region is identified by selecting a geometrical region on the first template. The method then involves the generation of an interim template based on the identification which is used for analyzing the plurality of documents to extract data values in the data region. The above steps aid in converting the documents to a format compliant with the target template.

According to another aspect of the present invention, annotating the first template comprises of identifying multiple regions on the first template corresponding a set of data values to be extracted through a target template.

According to yet another embodiment, identification of a data region is performed by determination of a start and an end of a geometrical region obtained by the annotation.

In another embodiment, extracted data values comprise a key field and a value field corresponding to the key field.

In yet another embodiment, a repository of extracted data values is maintained.

In a further another embodiment, the repository is pre-populated with a domain vocabulary and a set of standard data values relevant to the plurality of documents.

An ambodiment also describes that plurality of documents are analyzed using the interim template and the set of standard data values.

Another embodiment further describes that the step of analyzing the plurality of documents generates new domain vocabulary which is stored in the repository.

One more embodiment describes the step of converting the documents comprises of presenting the generated data values through a user interface in a format compliant with a target template.

BRIEF DESCRIPTION OF THE DRAWINGS

The various embodiments of the invention will hereinafter be described in conjunction with the appended drawings, provided to illustrate, and not to limit, the invention, wherein like designations denote like elements, and in which:

FIG. 4 illustrates an embodiment for selection of candidates for valid data fields.

FIG. 8 illustrates another embodiment of determining the edge of a zone of a matching expression.

DETAILED DESCRIPTION

Figure 1:
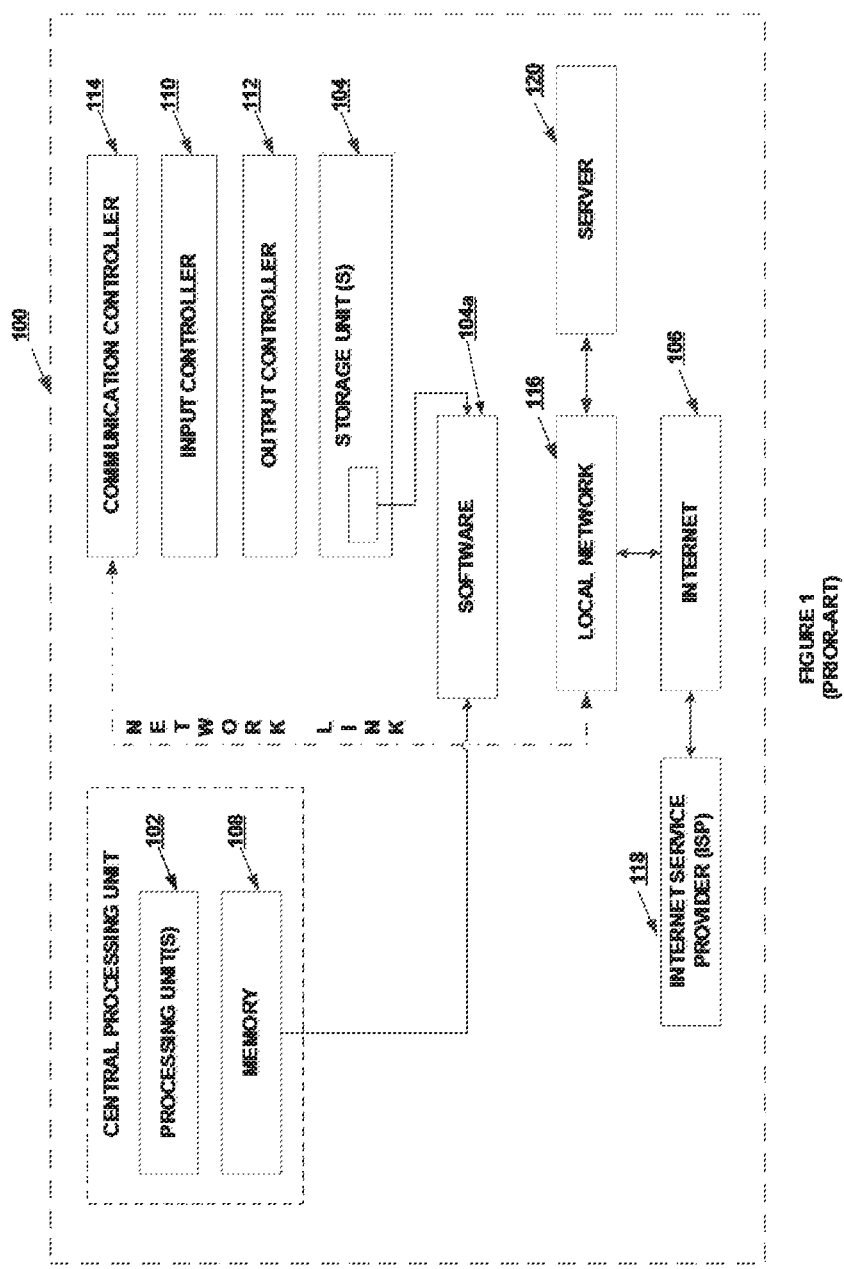
FIG. 1 illustrates a system in which various embodiments of the invention may be practiced, in accordance with an embodiment of the invention.
Figure 2:
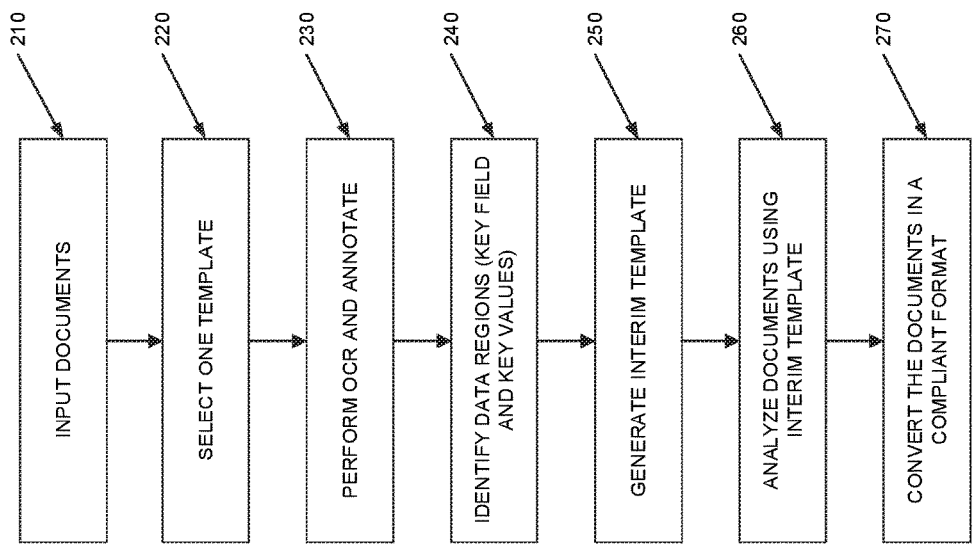
FIG. 2 illustrates an embodiment of the present invention.

In the disclosed embodiments, we propose text and image analytics based approaches to automatically detect and localize the key-value patterns by analyzing the text corpus generated invoice samples for specific vendors. In one approach we use heuristics techniques to mine the relationship between different text fields and another approach uses machine learning approaches to recover the templates from text corpus generated from past invoice samples. While the embodiment is susceptible to various modifications and alternative forms, specific embodiment thereof has been shown by way of example in the drawings and will be described in detail below. It should be understood, however that it is not intended to limit the invention to the particular forms disclosed, but on the contrary, the invention is to cover all modifications, equivalents, and alternative falling within the spirit and the scope of the invention as defined by the appended claims.

The method steps have been represented, wherever appropriate, by conventional symbols in the drawings, showing only those specific details that are pertinent to understanding the embodiments so as not to obscure the disclosure with details that will be readily apparent to those of ordinary skill in the art having benefit of the description herein.

The terms "comprises", "comprising", or any other variations thereof, are intended to cover a non-exclusive inclusion, such that a process, method that comprises a list of steps does not include only those steps but may include other steps not expressly listed or inherent to such process, method. Similarly, one or more elements in a system or apparatus proceeded by "comprises . . . a" does not, without more constraints, preclude the existence of other elements or additional elements in the system or apparatus.

The features of the present embodiment are set forth with particularity in the appended claims. The embodiment itself, together with further features and attended advantages, will become apparent from consideration of the following detailed description, taken in conjunction with the accompanying drawings.

The present embodiment describes extraction of data fields and data values from a document by performing various steps as is described in details in forthcoming sections. For the sake explanation and understanding, reference is drawn towards a typical BPO industry automation of data entry process heavily relies on using OCR technology for converting images to text in a document. Success of such automation platform mainly depends on how good and accurate OCR used in the platform. A majority of documents under consideration in such a scenario are invoices and other types of forms which are also referred to as images. Hereinafter, the following description refers to electronic documents (hereinafter referred as "document/s"), invoices and forms as being analogous to each other.

In reference with the above, an invoice document would have some structure in-place to specify several keys and values. From a technical point of view, these key and value pair can be seen as analogous to a data field and a corresponding data value pair that may exist in a document of the type being referred to here in the present embodiment and have been interchangeably used in the description that follows below.

FIG. 1 is a block diagram of a computing device 100 to which the present disclosure may be applied according to an embodiment of the present disclosure. The system includes at least one processor 102, designed to process instructions, for example computer readable instructions (i.e., code) stored on a storage device 104. By processing instructions, processing device 102 may perform the steps and functions disclosed herein. Storage device 104 may be any type of storage device, for example, but not limited to an optical storage device, a magnetic storage device, a solid state storage device and a non-transitory storage device. The storage device 104 may contain software 104a which is a set of instructions (i.e. code). Alternatively, instructions may be stored in one or more remote storage devices, for example storage devices accessed over a network or the internet 106. The computing device also includes an operating system and microinstruction code. The various processes and functions described herein may either be part of the microinstruction code or part of the program (or combination thereof) which is executed via the operating system. Computing device 100 additionally may have memory 108, an input controller 110, and an output controller 112 and communication controller 114. A bus (not shown) may operatively couple components of computing device 100, including processor 102, memory 108, storage device 104, input controller 110, output controller 112, and any other devices (e.g., network controllers, sound controllers, etc.). Output controller 112 may be operatively coupled (e.g., via a wired or wireless connection) to a display device (e.g., a monitor, television, mobile device screen, touch-display, etc.) in such a fashion that output controller 112 can transform the display on display device (e.g., in response to modules executed). Input controller 110 may be operatively coupled (e.g., via a wired or wireless connection) to input device (e.g., mouse, keyboard, touch-pad, scroll-ball, touch-display, etc.) in such a fashion that input can be received from a user. The communication controller 114 is coupled to a bus (not shown) and provides a two-way coupling through a network link to the internet 106 that is connected to a local network 116 and operated by an internet service provider (hereinafter referred to as 'ISP') 118 which provides data communication services to the internet. Network link typically provides data communication through one or more networks to other data devices. For example, network link may provide a connection through local network 116 to a host computer, to data equipment operated by an ISP 118. A server 120 may transmit a requested code for an application through internet 106, ISP 118, local network 116 and communication controller 114. Of course, FIG. 1 illustrates computing device 100 with all components as separate devices for ease of identification only. Each of the components may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 100 may be one or more servers, for example a farm of networked servers, a clustered server environment, or a cloud network of computing devices.

An embodiment describes a method of template creation for a data extraction tool. A user provides (210) a set of documents as input. These documents may be provided as an input by the user through a GUI based computer implemented tool. These documents may be input as, but not limited to, images of invoices, documents and forms. In a typical BPO industry scenario, as is being explained here, the most commonly input documents are order forms and invoices from which data entry is an essential exercise for digitization of data. One of the documents may be selected from the set of documents provided by the user and used as a first template. This first template is randomly selected from the set of documents provided by the user. A user verifiable optical character recognition (OCR) may be performed (230) using and OCR engine on the selected template to annotate the first template. The annotation is performed in order to identify (240) at least one data region in the first template corresponding to a set of parameters required in a target template. The set of parameters may be the fields and values as may be present in a target template. The identification of data regions is made by selecting a geometrical region on the first template. In an embodiment, the selection process may be performed manually, as an initial exercise to train the system. However it is the intention of the present embodiment that the selection of the geometrical region is dynamically performed upon receiving a first template by way of selection from a set of documents provided by the user. In another embodiment of the present embodiment, the selection of the first template may be automated through the use of existing methodologies of random selection of a document from a set of similar documents. The said selection of geometrical regions is then used in generating (250) an interim template based on the identification. This interim template is further used in analyzing (260) the plurality of documents to extract data values in the data regions. A heuristic engine applies a set of heuristics, that is, a set of rules, to the document for analyzing information in the document. The set of heuristics which are applied to the electronic document are associated with a particular document type. For example, if the document type is an "invoice", then the set of heuristics associated with the document type "invoice" is applied to the document. These heuristics enable extraction of the fields and values that may comprise the data regions. Once the processing and extraction of fields and values in the interim template is performed the interim template is used to convert (270) the input set of documents to a format compliant with the target template, based on the analysis. The conversion of the input set of documents is performed by the extrapolation of the interim template on the input set of documents to mark data region, and more specifically, data fields and data values on the said documents to make them easily identifiable by a tool used for data extraction from templates.

Another embodiment describes annotating the first template. The process of annotation comprises of identifying multiple regions on the first template corresponding a set of data fields to be extracted through a target template. A rectangular region is represented as a "zone", excluding approximately matching phrases other than the phrase marked by the user. In case of multiple zones, the largest zone in terms of area is selected. Edge of the zone to the nearest matching phrase is limited to half of the distance between the two phrases in the vertical and horizontal directions In yet another embodiment the parameters of a target template may be selected from, but not limited to, the following:
Parameter1—number of keys which are used as anchors for finding value
Parameter2—Phrase used for each key defined
Parameter3—Text boundary for each key as Paragraph, Line, Word, Part of Word. For example, if Text boundary is word then the phrase used for searching the key has to contain list of complete words within the defined threshold of Levenshtein's distance. Similar logic is applied for Paragraph, Line and Part of Word.
Parameter4—Threshold on Levenshtein's distance for each key. If a Phrase on the document matches the key phrase within this threshold then the Phrase is said to match.
Parameter5—Rectangular search zone for each key on the document. This is the area where key is searched.
Parameter6—Rectangular search zone for value relative to each defined key. This is are with respect to keys where value is searched.
Parameter7—Type of value, Regular Expression, List of Phrases.
Parameter8—Input value for each value Type. For example, for list of phrases and list of key phrases are supplied which have to be searched in the document.
Parameter9—Document Page Number where keys and values are present.

The above parameters may be best suited and used in the case of a Multi-key and value template.

Figure 3:
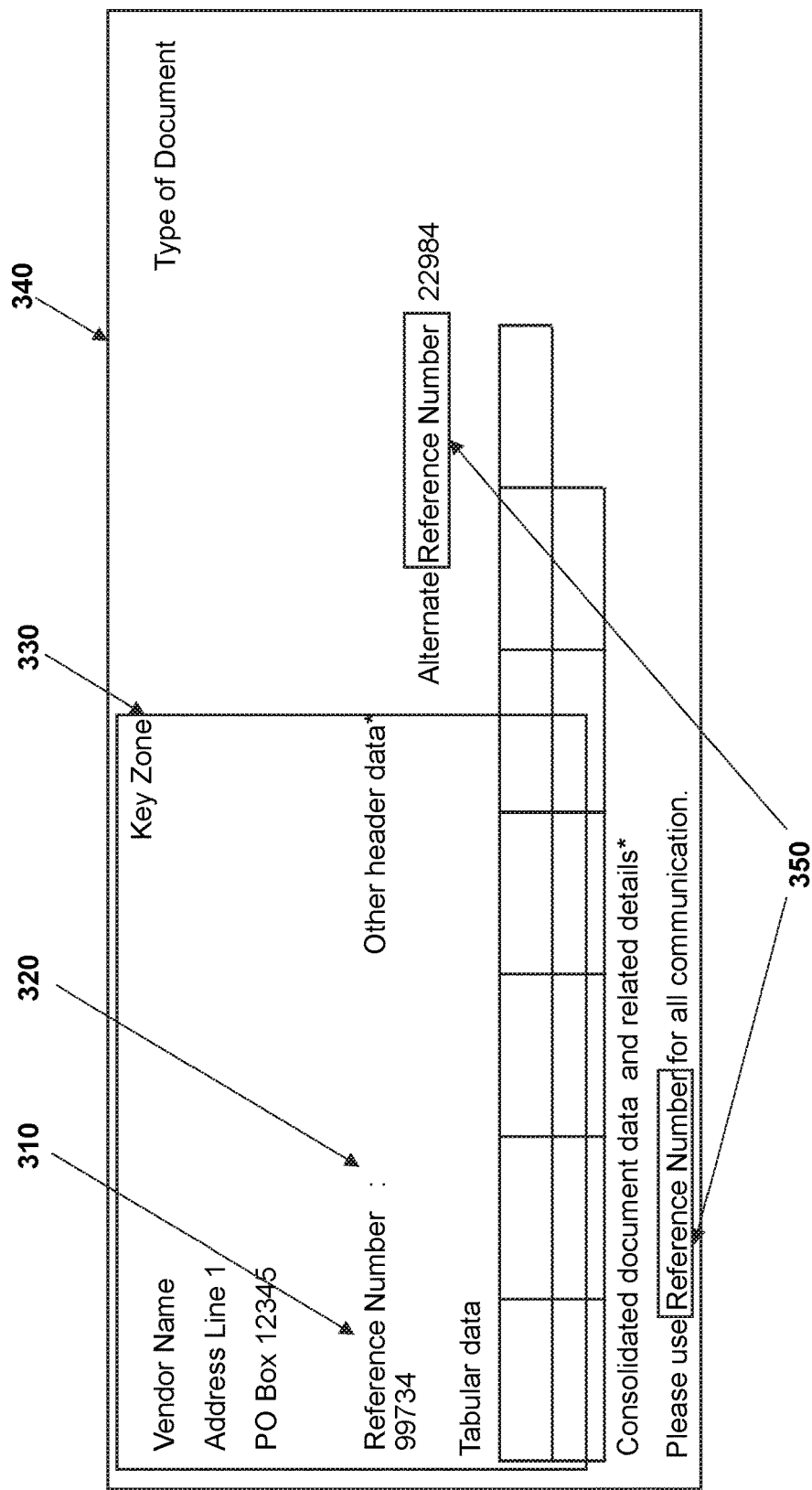
FIG. 3 illustrates an embodiment for extracting values within a document boundary.

In another embodiment and in reference to FIG. 3, First/All occurrence of the key field "Reference Number" (310) in the rectangular zone (330) may be considered for extracting values "99734" (320) within a document boundary (340). Duplicate occurrences (350) of the key may occur beyond the rectangular region. Selection of this parameter for each field type may be domain based.

In yet another embodiment and in reference to FIG. 4, phrases (410) occurring with similar variations in OCR results and occurring consistently across a set of documents may be treated as candidates for valid data fields.

In a further embodiment, the threshold is applied on approximate match of phrases where approximate match is defined as Levenshtein's distance. Threshold is defined in terms of word/phrase length and can be configured by user.

Figure 5:
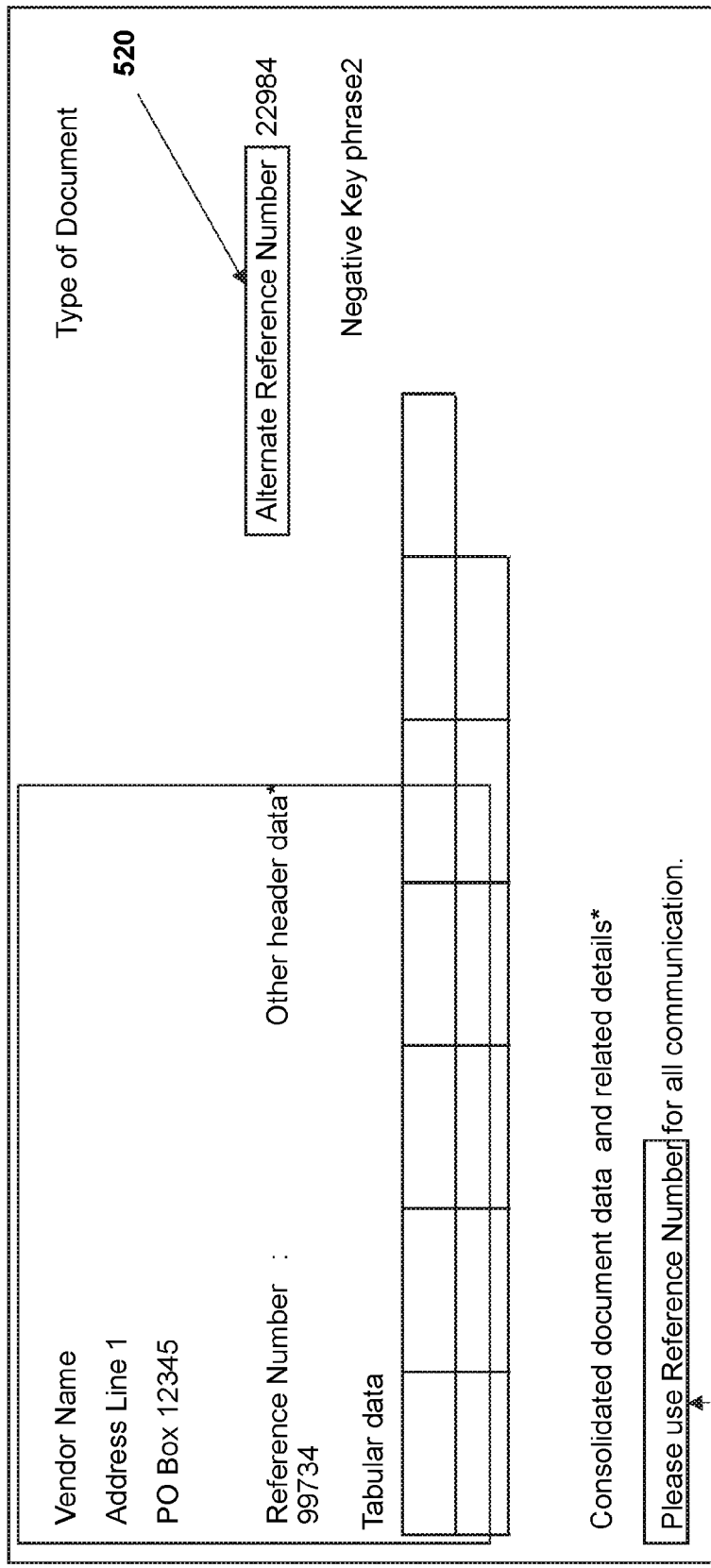
FIG. 5 illustrates an embodiment of exclusion of phrases.

In another embodiment and in reference to FIG. 5, negative set of phrases (510) and (520) are to be excluded while searching key as a combination of words adjacent to all the phrases along with the target phrase extracted above. Length of such a phrase may be restricted when its approximate match with the target phrase is less than threshold identified above.

In yet another embodiment identification of a data region is performed by determination of a start and an end of a geometrical region obtained by the annotation.

In one more embodiment extracted data values comprise a key field and a value field corresponding to the key field.

In another embodiment a repository of extracted data values is maintained in order to create a knowledge database.

In yet another embodiment the repository is pre-populated with a domain vocabulary and a set of standard data values relevant to the plurality of documents.

In one more embodiment plurality of documents are analyzed using the interim template and the set of standard data values.

In a further embodiment, the step of analyzing the plurality of documents generates new domain vocabulary which is stored in the repository.

In another embodiment, the step of converting the documents comprises of presenting the generated data values through a user interface in a format compliant with a target template.

In one more exemplifying embodiment a method for dynamic field extraction model is described. This method is achieved by the steps of receiving a plurality of documents as input and analyzing, using an OCR engine, each of the plurality of documents to identify and index data fields and corresponding data values for each document. The method also comprises of storing the data fields and the data values identified for each document in a repository. Subsequently a first geometrical region for data field and a relative second geometrical region for the corresponding data value are identified. This provides the system with sufficient data to generate a model for dynamic analysis of subsequent documents using the stored data fields, data values and the determined first and second geometrical regions.

Figure 6:
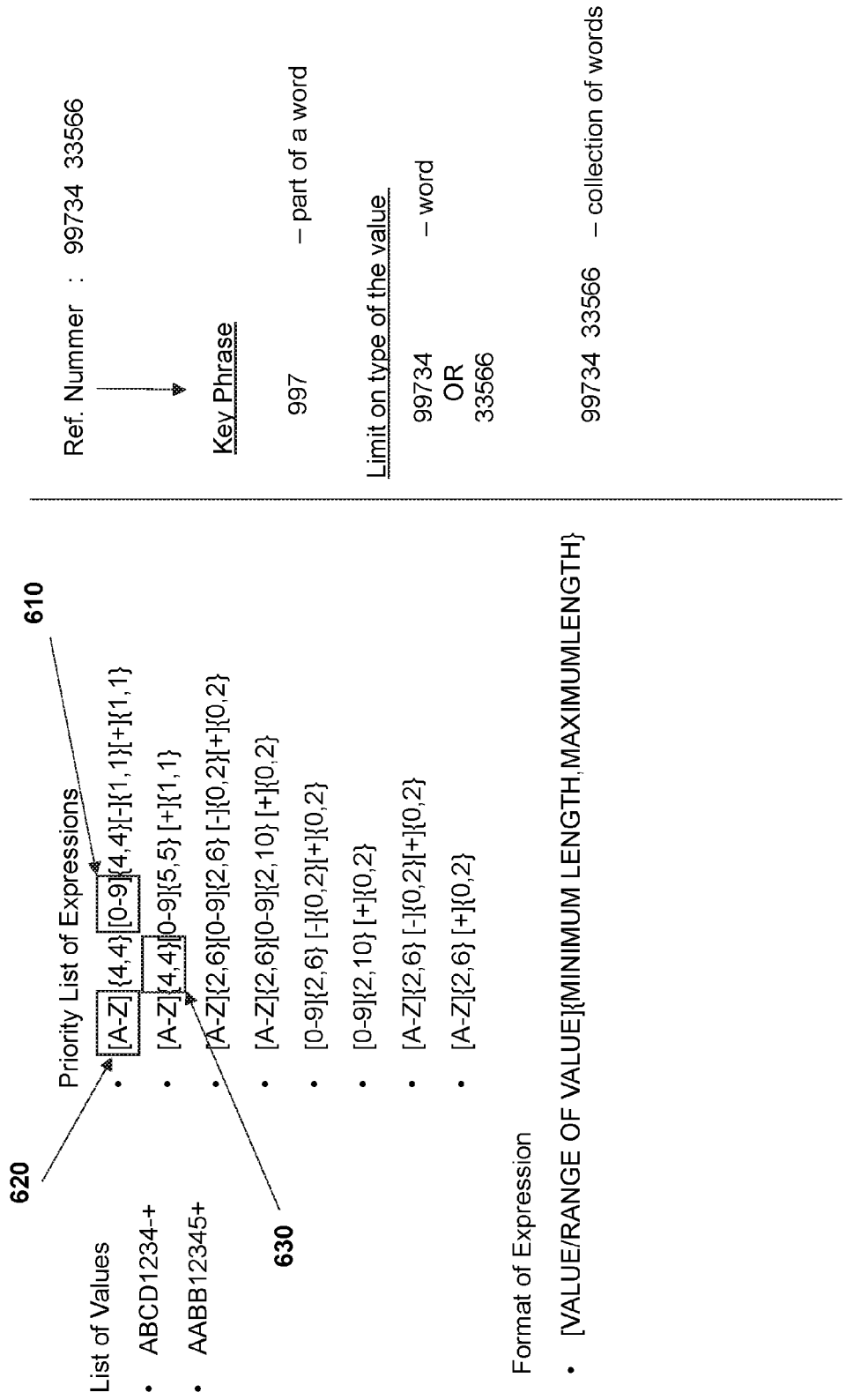
FIG. 6 illustrates an embodiment of determining priority list of regular expressions for text data.

In another embodiment, automatic identification of search zone for a value comprising of following parameters is described.

a) In reference to FIG. 6, a priority list of regular expressions for text data is to be extracted. Each expression in the priority list is arranged such that the most stringent expression is applied first followed by more general expressions for data extraction.

Stringent expression is defined as the regular expression that exactly matches the target value in the set of documents. Numbers are converted to range [0-9] (610) and similarly alphabets are converted to range [a-z] or [A-Z] (620) with length (630) specified as number of occurrence. Special characters are used as it is with fixed length specified. There may be more than one stringent expression.

Figure 7:
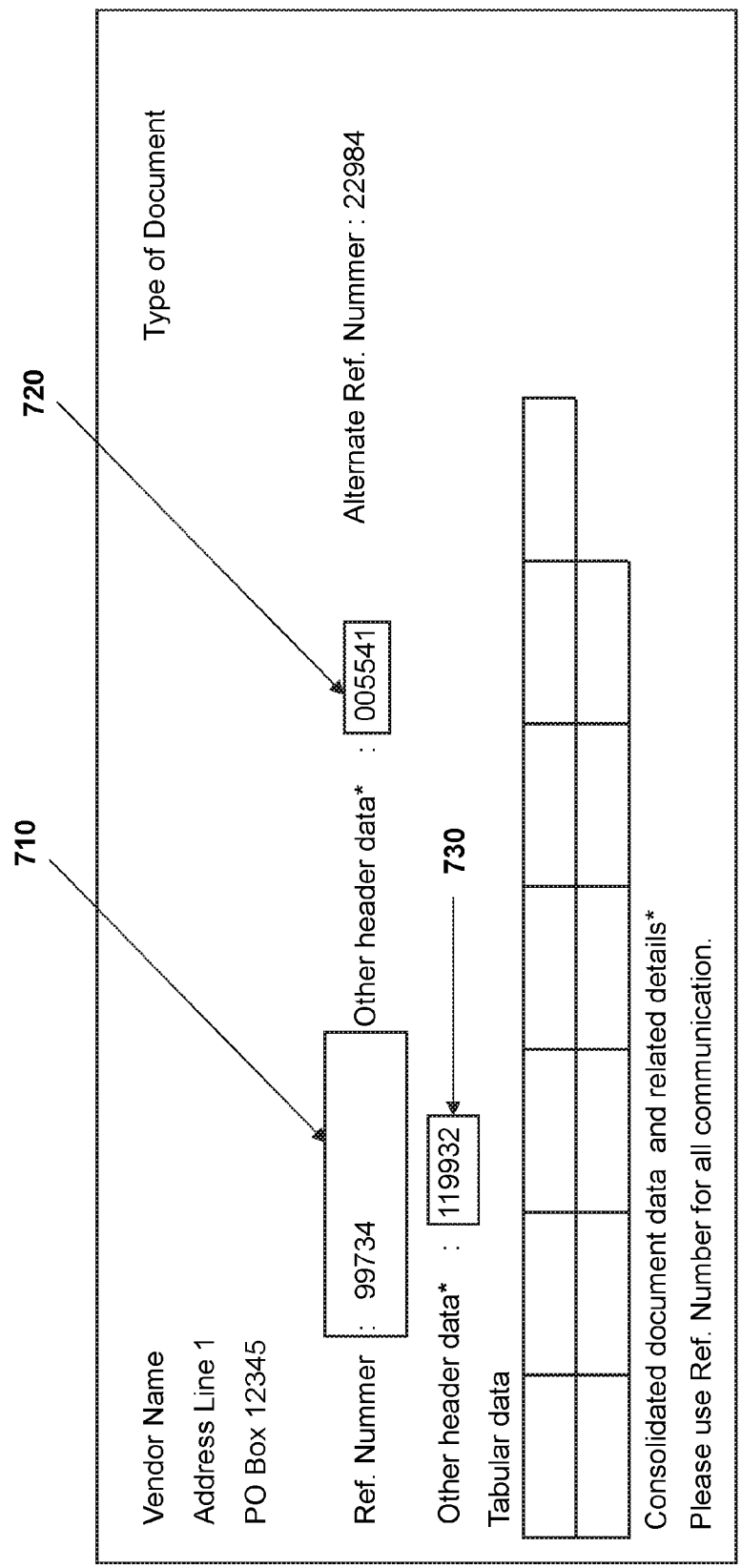
FIG. 7 illustrates an embodiment of determining the edge of a zone of a matching expression.

Subsequent general expressions are defined by:
1. Reducing the value of the lower limit and upper limit on length of numbers and alphabets. Minimum length is considered as half of original length (rounded off to lower limit) and Maximum length is taken as twice of original length. Lower limit on special characters are made zero. This results in second expression. Such second expression is generated for each unique stringent expression and placed at the end of the priority list.
2. Subsequently a combination is formed from the results of the earlier step. Each range of numbers and alphabets are eliminated from left to right in order to form more expressions. Each expression formed using these combinations are placed at the bottom of the priority list. The last list contains at least one range of numbers or alphabets. Special characters are used as defined in the earlier step.

b) In reference to FIG. 6, limit on type of the value is defined as a word, part of a word or a collection of words comprising single and multiple lines may be identified based on the limits of the selected values in the set of documents. In case limit of selected values in the set of documents is more than one, then boundaries are selected in the order, of collection of words comprising single and multiple line, word and part of a word.

c) A rectangular region is identified as a zone which excludes all the text in the document matching the collection of regular expressions for extracting the value excluding the text within the rectangular zone marked by the user.

i. In one embodiment and in reference to FIG. 7, either, the edge of the zone (710) to the nearest matching expression (720) and (730) is limited to half of the distance between the two phrases in the vertical and horizontal directions or is defined as the edge of largest rectangular zone of the target value annotated by user in the set of documents Alternatively it is also defined based on domain knowledge for the specific field type.

ii. In one more embodiment and in reference to FIG. 8, if the location of target value (810) is to the right of the key (820) in the set of documents, then the leftmost edge of the value zone is limited to the location of the rightmost character of the key phrase.

iii. If the location of target value is to the left of the key in the set of documents, then the rightmost edge of the value zone is limited to the location of the leftmost character of the key phrase.

iv. If the location of target value is to the top of the key in the set of documents, then the bottommost edge of the value zone is limited to the location of the top edge of the key phrase v. If the location of target value is to the bottom of the key in the set of documents, then the topmost edge of the value zone is limited to the location of the bottom edge of the key phrase vi. In another embodiment and in reference to FIG. 9, where more than one document is marked for a field type by the user, then steps (i)-(v) are applied on the first document containing the field type (910) followed by reduction in the four edges, if required for the subsequent documents. Reduction in the edges may not be made if the reduced value zone excludes the location of the target value in any of the earlier documents.

In a further embodiment, automatic identification of key/s phrases by detecting invariant phrases in the collection of documents is described. Invariant phrase is defined as a single word or a collection of words in a single line on a specific page within the set of documents with following features:
a. A tolerance of ten percent in the vertical and horizontal location of top-left of the rectangular zone having the phrase from the top-left of "pagesize". Pagesize is defined as the smallest rectangular region in a particular page of a document containing all the computer readable text.
b. Tolerance in approximate match of the phrase across the set of documents as defined above.

Figure 9:
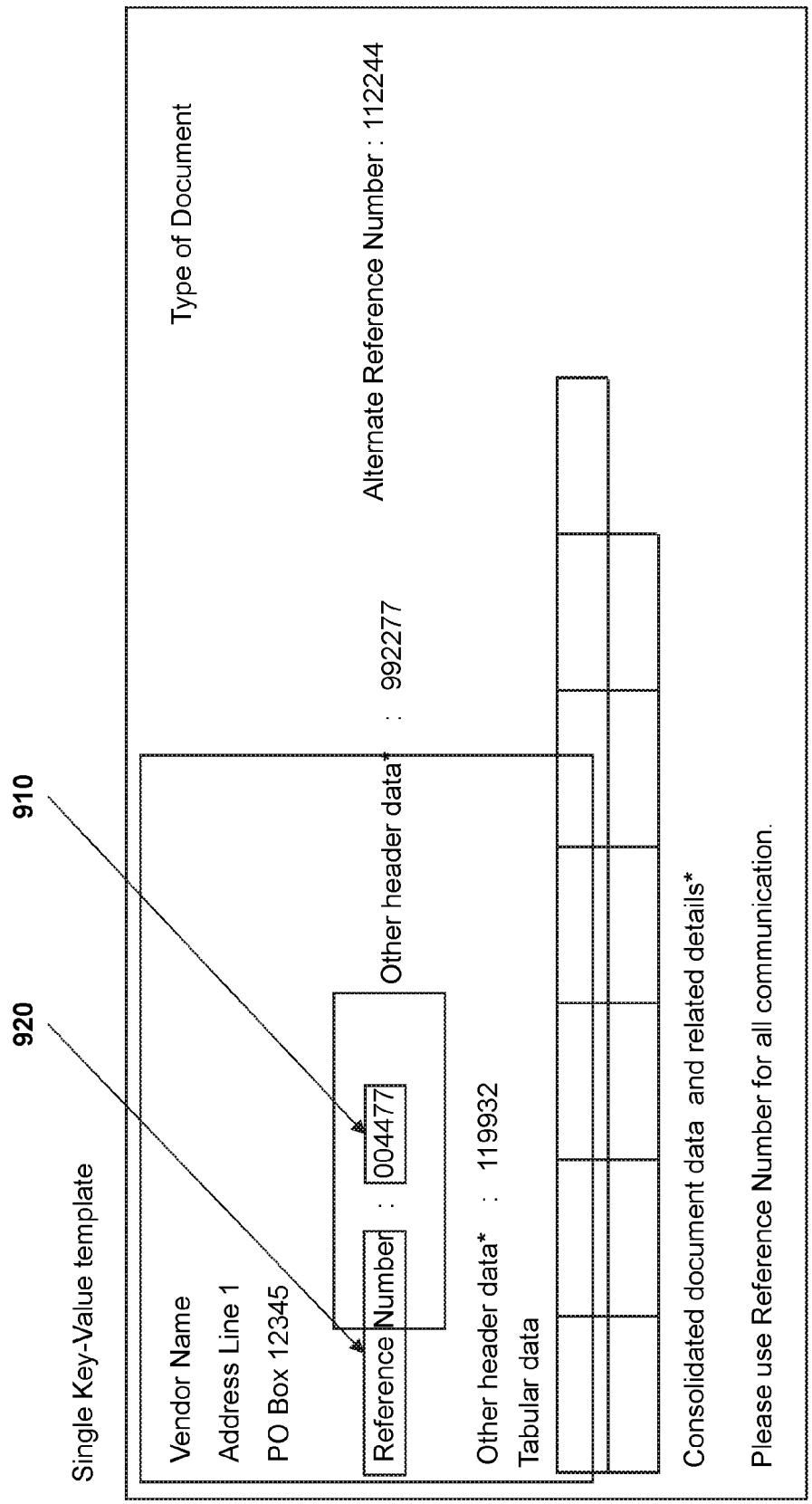
FIG. 9 illustrates an embodiment of single key and value template with automatic identification of search zone for key and value.

In yet another embodiment and in reference to FIG. 9, single key and value template with automatic identification of search zone for key and value is described. A single key (920), which is a user defined data field is used as an anchor to find the search for the expected value (910). On finding the key data field, for example a phrase, value data field is automatically searched in the user defined area relative to the key. A single key and value template may lead to a single output as value or multiple outputs. Only one output is chosen among these as the correct value based on topological confidence. Value with highest topological confidence is considered as correct value.

Figure 10:
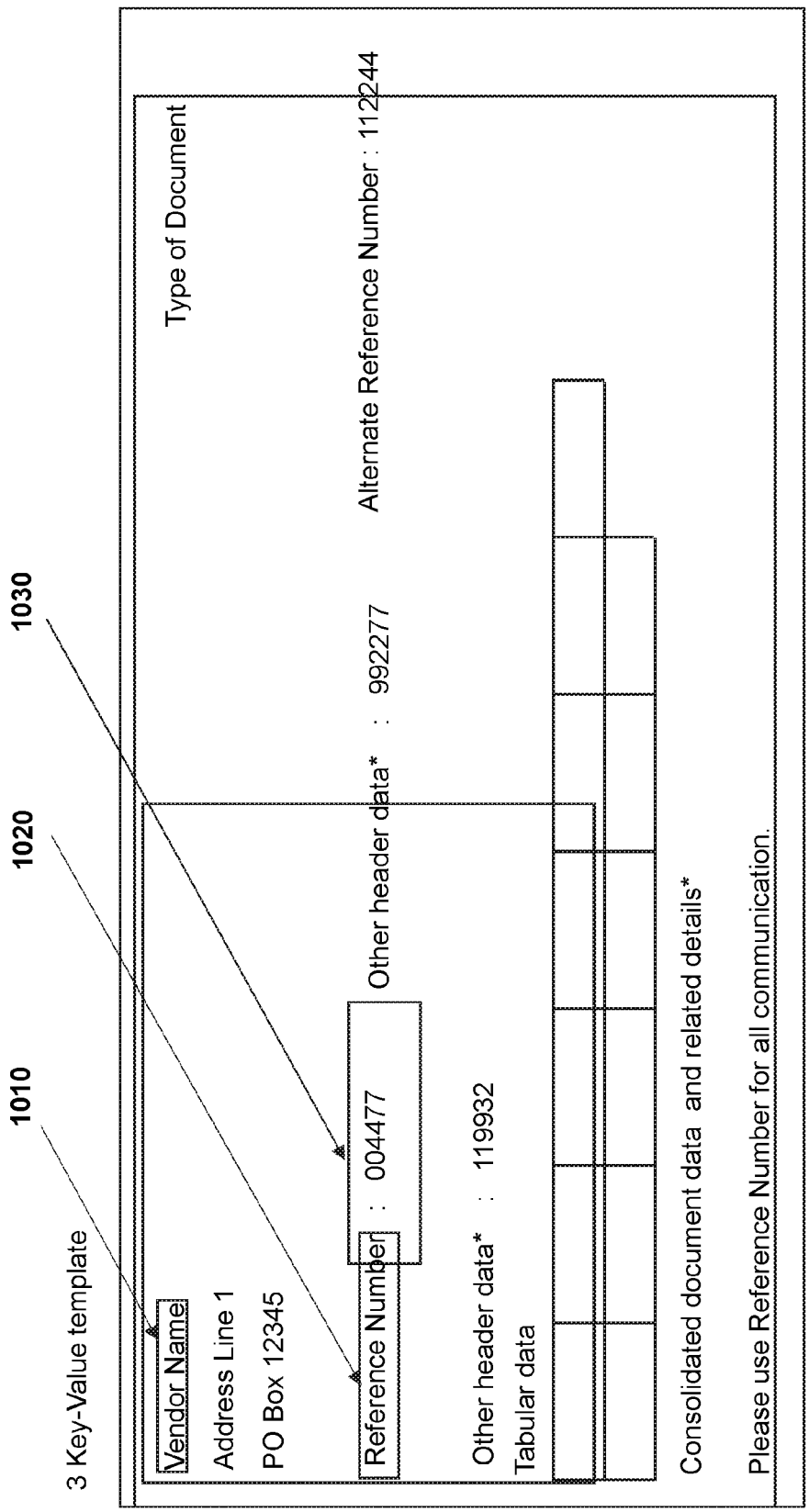
FIG. 10 illustrates an embodiment of multi-key and value template with automatic identification of search zone for key and value.
Figure 11:
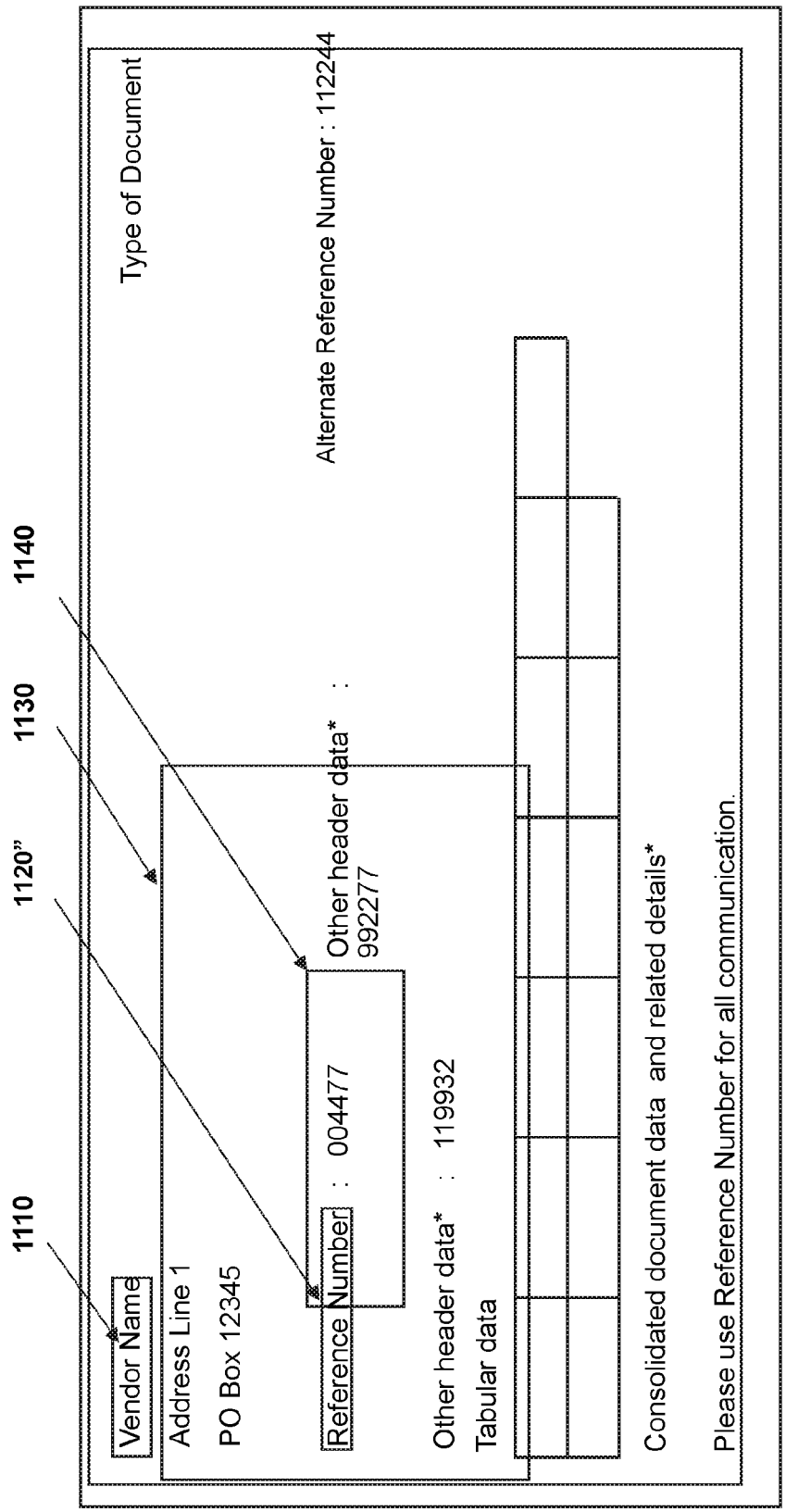
FIG. 11 illustrates an embodiment of multi-key and value based hierarchical template.

In one more embodiment, multi-key and value template with automatic identification of search zone for key and value is described in reference to FIG. 10. Multiple keys (1010) and (1020) are defined as a collection of key phrase marked by the user and the set of invariant phrases identified above. Maximum and minimum limit on the length of the key phrases and the percentage of key phrases found is configurable. Value zone (1030) for multi-key template is defined as the largest overlapping zone of individual zones for each key In a further embodiment multi-key and value based hierarchical template is described in reference to FIG. 11. As in case in the immediately preceding embodiment, multiple keys are defined as a collection of key phrase marked by the user and the set of invariant phrases as identified above. Following rules are followed:
a. The keys marked by the user are used as the first key (1110). First value (1120) is defined as second key field. This is the first key-value field in hierarchical template. Second invariant phrase which is nearest to the first marked key is selected as first value of key-value. The Rectangular zone (1130) becomes the key search zone for the second key-value. Target value to be extracted is defined as a key-value field with respect to the value search zone (1140) of the last invariant key phrase.

b. Maximum and minimum number of levels in the hierarchical key-value template is configurable c. Minimum and maximum length of invariant phrase to be used as key is configurable In a further embodiment, the process of automatic template creation uses training the templates. This process comprises of extracting Key-value pair patterns from a template library which provides static and varying text regions along with bounding boxes. Subsequently domain vocabulary is created by populating a repository with the extracted values. This domain vocabulary may be used for dynamic template creation.

In yet another embodiment, topological confidence for the extracted value is defined as follows. The rectangular zone of the key used for the detected value and the rectangular zone for the detected value are found. These zones are defined as the smallest bounding rectangle encompassing the data fields. Two rectangular zones are considered to be overlapping in the horizontal direction if parallel lines drawn from each point on the two zones in X-axis on either directions overlap. Similarly two zones are considered as overlapping in vertical direction if parallel lines from each point on the two zones in Y-axis overlap. The same may be explained as under:

1. If (horizontal overlap between value and any identified key zones) then TopologicalConfidence=1
2. If (vertical overlap between value and any identified key zones) then TopologicalConfidence=1
3. Others: TopologicalConfidence=1/(1+Minimum (Vertical distance, Horizontal Distance, Euclidean Distance)).

User verifies only those header fields where Confidence Value is lower than a predefined threshold. Threshold is defined by the user.

In another embodiment, a confidence measure may also be defined as a linear combination of OCR confidence and closeness to key phrases for the detection value region. Example of key phrases for few of the invoice header fields are shown below, Purchase order number—Customer order, P/O No, Shipping Ref/PO, Customer order Number, Cust Order No, Order Number, Purchase Order, Customer—PO, Purchase Order No, PO Number, PO No, PO#

Invoice Number—Invoice Number, Invoice No., Inv No, Inv. No., Invoice#, Number, Inv Number Invoice Date—Invoice Date, Inv Date, Date of Invoice, Date Confidence Value=$W^1$*OCRConfidence+$W^2$*TopologicalConfidence $W^1$ and $W^2$ are identified experimentally. Generally value of $W^1<W^2$ and $W^1+W^2=1$ OCRConfidence is provided by the OCR engine provided by the data extraction software. Value of OCRConfidence has value [0, 1]. 1 represents highest confidence.

In a further embodiment, the system learns how to extract each field value based on the past extracted values available in the system. In another step document characteristics are extracted and checked if a similar document type exists in its knowledge base. Based on the document type, the required fields and corresponding values are extracted from the appropriate locations annotated initially. Invoices from knowledge base with poor quality are rejected in order to ensure high quality of field value extraction. Any corrections that are done during the review process is fed back to the learning system to enhance the knowledge base.

In another exemplifying embodiment, there is provided a system one or more processors and one or more memories operatively coupled to at least one or more processors and having instructions stored thereon that, when executed by the at least one or more processors, cause at least one of the one or more processors to select a first template from a plurality of documents provided by a user and perform a user verifiable OCR to annotate the first template. Also to identify at least one data region in the first template corresponding to a set of parameters required in a target template, wherein the data region are identified by selecting a geometrical region on the first template and generate an interim template based on the identification. Further analyze the plurality of documents using the interim template to extract data values in the data region and convert the documents to a format compliant with the target template based on the analysis.

In one embodiment, an automated learning module utilizes the data values and the domain vocabulary to automatically generate an interim template.

In another embodiment, a validation module validates the interim template for compliance with the target template.

In yet another embodiment, annotating the first template comprises of identifying multiple regions on the first template corresponding a set of data values to be extracted through a target template.

In further another embodiment, identification of a data region is performed by determination of a start and an end of a geometrical region obtained by the annotation.

In a different embodiment, plurality of documents are analyzed using the interim template and the set of standard data values.

In one other embodiment, wherein the step of analyzing the plurality of documents generates new domain vocabulary which is stored in the repository.

In yet another embodiment, the step of converting the documents comprises of presenting the generated data values through a user interface in a format compliant with a target template.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein.

Elements of the described embodiments shown in software may be implemented in hardware and vice versa.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory. Modules can be defined by executable code stored on non-transient media.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

We claim:

1. A computer implemented method, executed by one or more computing devices, of template creation for a data extraction tool comprising:
    selecting, by at least one of computing devices, a first template from a plurality of documents provided by a user;
    performing, by an OCR engine, an optical character recognition to annotate the first template;
    automatically identifying, by at least one of the computing devices, a first rectangular geometrical region for a data field and a second rectangular geometrical region, relative to the first geometrical region, for a corresponding data value in the first template, the data field and data value corresponding to a set of parameters required in a target template, wherein for each of the first and second geometrical regions, edges of the geometrical region are limited, in vertical and horizontal directions, to half of a distance between the data field or value of the geometrical region to a nearest matching data field or value;
    generating, by at least one of the computing devices, at least one interim template based on the identification of the first geographical region and the second geographical region, wherein an automated learning module utilizes the data value and a domain vocabulary to automatically generate the interim template;
    analyzing, by at least one of the computing devices, the plurality of documents using the interim template to extract the data value in the second geometrical region; and
    converting, by at least one of the computing devices, the plurality of documents to a format compliant with the target template based on analyzing the plurality of documents.

2. The method as claimed in claim 1, wherein annotating the first template comprises of identifying multiple regions on the first template corresponding a set of data values to be extracted through a target template.

3. The method as claimed in claim 1, wherein identification of a geometrical region is performed by determination of a start and an end of the geometrical region obtained by the annotation.

4. The method as claimed in claim 1, wherein a repository of extracted data values is maintained.

5. The method as claimed in claim 4, wherein the repository is pre-populated with the domain vocabulary and a set of standard data values relevant to the plurality of documents.

6. The method as claimed in claim 5, wherein plurality of documents are analyzed using the interim template and the set of standard data values.

7. The method as claimed in claim 6, wherein the step of analyzing the plurality of documents generates new domain vocabulary which is stored in the repository.

8. The method as claimed in claim 1, wherein the step of converting the plurality of documents comprises of presenting the generated data values through a user interface in a format compliant with the target template.

9. The method as claimed in claim 1, further comprising:
    based on the annotation, identifying multiple data values that could be related to the data field;
    calculating a topological confidence for each of the multiple data values based on whether rectangular zones of the multiple data values are overlapping; and
    identifying the data value with the highest topological confidence as being associated with the data field.

10. A computer implemented method, executed by one or more computing devices, for dynamic field extraction model, comprising:
    receiving, using a graphical user interface (GUI), a plurality of documents as input;
    analyzing, using an OCR engine, each of the plurality of documents to identify and index data fields and corresponding data values for each document;
    storing, in a repository, the data fields and the data values identified for each document;
    automatically determining, by at least one of computing devices, a first rectangular geometrical region for data field and a relative second rectangular geometrical region for the corresponding data value, the data field and data value corresponding to a set of parameters required in a target template, wherein edges of the first and second geometrical regions are limited, in vertical and horizontal directions, to half of a distance between the data field or value of the geometrical region to a nearest matching data field or value;
    generating an interim template based on the determined first geographical region and the second geographical region, wherein an automated learning module utilizes the data value and a domain vocabulary to automatically generate the interim template;
    analyzing subsequent documents using the interim template to extract the data value in the second geometrical region; and
    converting the subsequent documents to a format compliant with the target template based on the analyzing the subsequent documents.

11. The method as claimed in claim 10, wherein the storing of the data fields and the data values in the repository comprises creating a database of data fields and data values.

12. The method as claimed in claim 10, wherein the dynamic analysis analyzing comprises:
    performing an OCR on the subsequent documents;
    searching the subsequent documents to identify at least one data field present in the repository and a data value corresponding to the identified data field.

13. A system of template creation for a data extraction tool comprising:
    one or more processors; and
    one or more memories operatively coupled to at least one of the one or more processors and having instructions stored thereon that, when executed by at least one of the one or more processors, cause at least one of the one or more processors to:
select a first template from a plurality of documents provided by a user;
perform, through an OCR engine, an optical character recognition to annotate the first template;
automatically identify a first rectangular geometrical region for a data field and a second rectangular geometrical region, relative to the first geometrical region, for a corresponding data value in the first template, the data field and data value corresponding to a set of parameters required in a target template, wherein for each of the first and second geometrical regions, edges of the geometrical region are limited, in vertical and horizontal directions, to half of a distance between the data field or value of the geometrical region to a nearest matching data field or value;
generate an interim template based on the identification of the first geographical region and the second geographical region, wherein an automated learning module utilizes the data value and a domain vocabulary to automatically generate the interim template;
analyze the plurality of documents using the interim template to extract the data value in the second geometrical region; and
convert the plurality of documents to a format compliant with the target template based on the analyzing the plurality of documents.

14. The system as claimed in claim 13, wherein a validation module validates the interim template for compliance with the target template.

15. The system as claimed in claim 13, wherein annotating the first template comprises of identifying multiple geometrical regions on the first template corresponding a set of data values to be extracted through a target template.

16. The system as claimed in claim 13, wherein identification of a geometrical region is performed by determination of a start and an end of the geometrical region obtained by the annotation.

17. The system as claimed in claim 13, wherein plurality of documents are analyzed using the interim template and a set of standard data values.

18. The system as claimed in claim 17, wherein the step of analyzing the plurality of documents generates new domain vocabulary which is stored in the repository.

19. The system as claimed in claim 13, wherein the step of converting the plurality of documents comprises of presenting the generated data values through a user interface in a format compliant with the target template.

* * * * *